US011965748B2

(12) United States Patent
Ji

(10) Patent No.: US 11,965,748 B2
(45) Date of Patent: Apr. 23, 2024

(54) TRANSPORTATION SYSTEM AND OPERATION METHOD THEREOF

(71) Applicant: HYUNDAI MOBIS CO., LTD., Seoul (KR)

(72) Inventor: Yong Kwan Ji, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/468,212

(22) Filed: Sep. 7, 2021

(65) Prior Publication Data

US 2022/0113149 A1    Apr. 14, 2022

(30) Foreign Application Priority Data

Oct. 8, 2020  (KR) .................. 10-2020-0130248

(51) Int. Cl.
  *G01C 21/34* (2006.01)
  *G01C 21/36* (2006.01)

(52) U.S. Cl.
  CPC ..... *G01C 21/3438* (2013.01); *G01C 21/3484* (2013.01); *G01C 21/3605* (2013.01)

(58) Field of Classification Search
  CPC ............ G01C 21/3438; G01C 21/3484; G01C 21/3605
  See application file for complete search history.

(56) References Cited

U.S. PATENT DOCUMENTS

| | | | |
|---|---|---|---|
| 3,916,588 A * | 11/1975 | Magill ..................... | B64F 1/00 52/33 |
| 6,317,720 B1 | 11/2001 | Murakami et al. | |
| 6,453,298 B2 | 9/2002 | Murakami et al. | |
| 9,234,765 B1 | 1/2016 | Padovitz et al. | |
| 2007/0282520 A1* | 12/2007 | Cradick ................. | F02D 41/021 701/123 |
| 2011/0059693 A1 | 3/2011 | O'Sullivan | |
| 2011/0218834 A1 | 9/2011 | Boss et al. | |
| 2012/0251276 A1* | 10/2012 | Rathbun .................. | E04H 6/22 414/800 |
| 2012/0290185 A1 | 11/2012 | Cooper et al. | |
| 2015/0221225 A1 | 8/2015 | Petersen et al. | |

(Continued)

FOREIGN PATENT DOCUMENTS

| | | |
|---|---|---|
| CN | 111639854 B | 10/2023 |
| KR | 10-0979752 B1 | 9/2010 |
| WO | WO 2018/087811 A1 | 5/2018 |

OTHER PUBLICATIONS

Anonymous, Hyundai Motor Presents Smart Mobility Solation UAM-PBV-Hub to Vitalize Future Cities dated Jan. 7, 2020 (Year: 2020).*

(Continued)

*Primary Examiner* — Anne Marie Antonucci
*Assistant Examiner* — Patrick M Brady
(74) *Attorney, Agent, or Firm* — NSIP Law

(57) ABSTRACT

A transportation system includes: a vehicle hub including a plurality of connection slots. The vehicle hub is configured such that, in response to vehicles being parked respectively in the connection slots, the vehicle hub is connected to interior spaces of the vehicles through the connection slots, the vehicles are categorized by use, and the connection slots are grouped by category such that connection slots grouped together by category, among the connection slots, are disposed adjacent to each other.

11 Claims, 3 Drawing Sheets

(56) References Cited

U.S. PATENT DOCUMENTS

| | | | |
|---|---|---|---|
| 2016/0321925 | A1 | 11/2016 | Al Suwaidi |
| 2016/0343068 | A1 | 11/2016 | Barrois et al. |
| 2018/0108103 | A1 | 4/2018 | Li et al. |
| 2018/0136655 | A1 | 5/2018 | Kim et al. |
| 2018/0222340 | A1* | 8/2018 | Zhao ................. B60L 53/68 |
| 2018/0357912 | A1 | 12/2018 | Kessler et al. |
| 2018/0366004 | A1* | 12/2018 | Laetz ................. G06Q 10/02 |
| 2019/0108468 | A1 | 4/2019 | Nguyen et al. |
| 2019/0137290 | A1* | 5/2019 | Levy ................. G05D 1/0088 |
| 2020/0098261 | A1 | 3/2020 | O'Sullivan |
| 2020/0217677 | A1* | 7/2020 | Wang ............... G01C 21/3415 |
| 2020/0226498 | A1* | 7/2020 | Jiwani ................. G06Q 10/02 |
| 2020/0311641 | A1* | 10/2020 | Noguchi ............... G08G 1/146 |
| 2021/0166164 | A1 | 6/2021 | Proctor et al. |
| 2021/0380022 | A1* | 12/2021 | Kanitz ................. B60N 2/01 |
| 2022/0364866 | A1* | 11/2022 | Williams ............. B64C 39/024 |

OTHER PUBLICATIONS

Hyundai. "Hyundai Motor Presents Smart Mobility Solution 'UAM-PBV-Hub' to Vitalize Future Cities" [2020] www.hyundai.com Jun. 7, 2020 <https://www.hyundai.com/worldwide/en/company/newsroom/hyundai-motor-presents-smart-mobility-solution-%25E2%2580%2598uam-pbv-hub%25E2%2580%2599-to-vitalize-future-cities-0000016368#:~:text=Release-,Hyundai%20Motor%20Presents%20Smart%20Mobility%20Solution%20%27UAM%2DPBV%2D,Hub%27%20to%20Vitalize%20Future%20Cities&text=LAS%20VEGAS%2C%20January%206%2C%202020,vitalize%20human%2Dcentered%20future%20cities.>.

Extended European Search Report dated Feb. 10, 2022 in counterpart European Patent Application No. 21196469.7 (8 pages in English).

Pechlaner, Harald et al., "Overtourism: Tourism Management and Solutions," Contemporary Geographies of Leisure, Tourism, and Mobility, 2020, (33 Pages in English).

United States Office Action dated Mar. 16, 2023, in U.S. Pat. No. 17/467,993 (29 Pages in English).

United States Office Action dated May 12, 2023, in U.S. Appl. No. 17/474,512 (29 pages in English).

United States Office Action dated Jun. 9, 2023, in U.S. Appl. No. 17/467,993 (38 pages in English).

U.S. Office Action issued on Nov. 21, 2023, in related U.S. Appl. No. 17/474,512 (32 pages).

U.S. Office Action issued on Feb. 1, 2024, in U.S. Appl. No. 17/467,993 (11 pages).

* cited by examiner

TRANSPORTATION SYSTEM AND OPERATION METHOD THEREOF

CROSS-REFERENCE TO RELATED APPLICATIONS

This application claims the benefit under 35 U.S.C. § 119(a) of Korean Patent Application No. 10-2020-0130248 filed on Oct. 8, 2020 in the Korean Intellectual Property Office, the entire disclosure of which is incorporated herein by reference in for all purposes.

BACKGROUND

1. Field

The present invention relates to a transportation system configured such that a plurality of vehicles having different uses is provided, the plurality of vehicles is parked in connection slots of a vehicle hub that functions as a complex terminal, the vehicles are categorized by use, the connection slots are grouped by category, and the grouped collection slots are disposed adjacent to each other in the vehicle hub and an operation method thereof.

2. Description of the Related Art

For a conventional vehicle, which is a transportation means, a driver directly drives in a driver's seat or a passenger sits in a passenger seat or back seats performing limited activities. With increasing development of autonomous driving technology, however, relative importance of people in vehicles has gradually decreased. In addition, development of an electric vehicle requiring no large internal combustion engine has been actively conducted. Conventionally, articles that may be provided in the vehicle excluding the seats are limited. Since a larger space is provided in an electric vehicle having the same size as a conventional vehicle, however, a passenger may perform a wider variety of activities in the vehicle.

Therefore, a concept of a purpose built vehicle in which the vehicle has a specific purpose and is provided with articles for the purpose, and development of various operation systems capable of using or managing the purpose built vehicle is required.

The matters disclosed in this section are merely for enhancement of understanding of the general background of the invention and should not be taken as an acknowledgment or any form of suggestion that the matters form the related art already known to a person skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a transportation system includes: a vehicle hub including a plurality of connection slots. The vehicle hub is configured such that, in response to vehicles being parked respectively in the connection slots, the vehicle hub is connected to interior spaces of the vehicles through the connection slots, the vehicles are categorized by use, and the connection slots are grouped by category such that connection slots grouped together by category, among the connection slots, are disposed adjacent to each other.

The transportation system may further include a server configured to collect passenger information related to a use of the vehicles preferred by passengers, match the passengers with the connection slots or the vehicles based on the passenger information, and guide the passengers to the matched connection slots or vehicles.

The server may be further configured to request consent for collection of the passenger information upon receiving a request for a vehicle from a terminal of each passenger among the passengers, and collect the passenger information from the terminal in response to the consent for collection of the passenger information being obtained from the terminal.

The passenger information may include any one or any combination of any two or more of retrieval information of the terminal, location information, health information, picture information, and commodity purchase information. The server may be further configured to select a use of a vehicle, among the vehicles, to be matched with each passenger based on the any one or any combination of any two or more of the retrieval information of the terminal, the location information, the health information, the picture information, and the commodity purchase information.

The server may be further configured to set a movement route of a vehicle, among the vehicles, based on a use of the vehicle matched with a passenger among the passengers, and perform control such that the vehicle moves along the set movement route after boarding of the passenger.

The vehicles may be categorized by use by being classified in a category among a rest category, a health care category, a business category, and a taste category.

A vehicle classified in the rest category, among the vehicles, may be equipped with a bed or a chair, to induce sleep or meditation of the passenger.

A vehicle classified in the health care category, among the vehicles, may be equipped with a remote medical treatment module, a physical therapy module, a rehabilitation module, or a first aid module.

A vehicle classified in the business category, among the vehicles, may be equipped with a computer, a facsimile, a copier, or a scanner.

A vehicle classified in the taste category, among the vehicles, may be equipped with a movie watching module, a music listening module, a fitness equipment module, a food provision module, a reading module, or a game module.

Articles provided in the vehicles may be replaced depending on the use or the category.

The vehicle hub may further include a waiting area at which the passengers wait before boarding the vehicles. The connection slots may be disposed closer to the waiting area in a case in which an urgency of the category in which corresponding vehicles, among the vehicles, are classified is high than in a case in which the urgency of the category in which the corresponding vehicles are classified is low.

In another general aspect, a method of operating a transportation system includes: categorizing vehicles connected respectively to connection slots of a vehicle hub by use; grouping the connection slots by category; and allocating the connection slots to the vehicle hub such that connection slots grouped together by category, among the connection slots, are disposed adjacent to each other.

The method may further include: collecting passenger information related to a use of vehicles preferred by passengers; and selecting a use of the vehicles to be matched with the passengers based on the passenger information, before the categorizing of the of vehicles by use.

The method may further include matching the passengers with the connection slots or the vehicles based on the passenger information, and guiding the passengers to the matched connection slots or vehicles, after the allocating of the grouped connection slots to the vehicle hub.

Other features and aspects will be apparent from the following detailed description, the drawings, and the claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
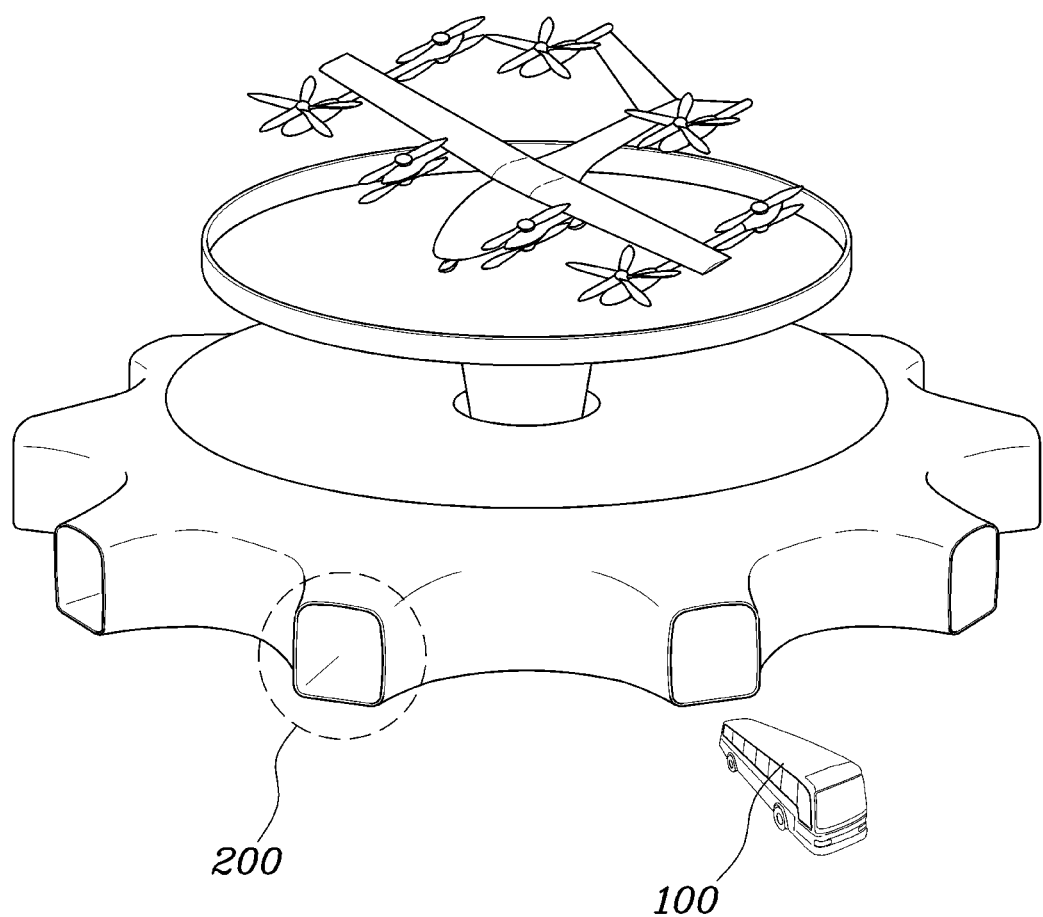
FIG. 1 is a view showing vehicles and connection slots in a vehicle hub of a transportation system according to an embodiment of the present invention.
Figure 2:
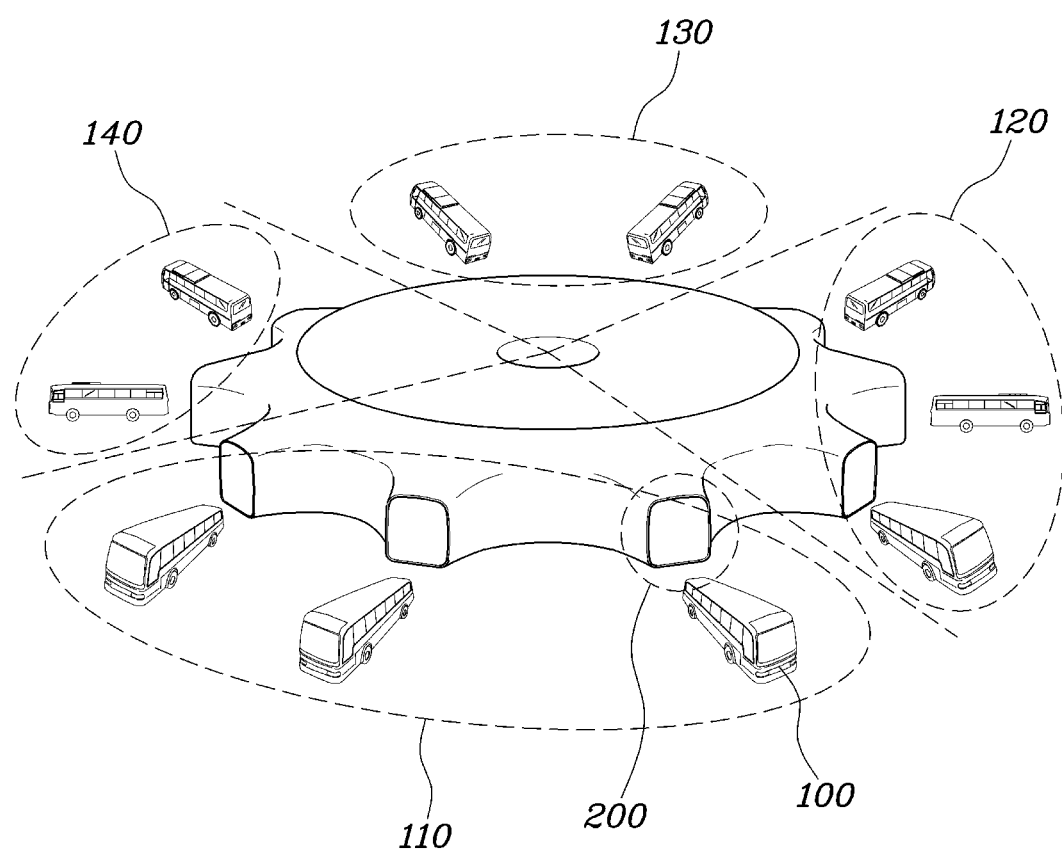
FIG. 2 is a view showing that a plurality of vehicles is categorized into grouped connection slots by use in the vehicle hub of the transportation system according to the embodiment of the present invention.
Figure 3:
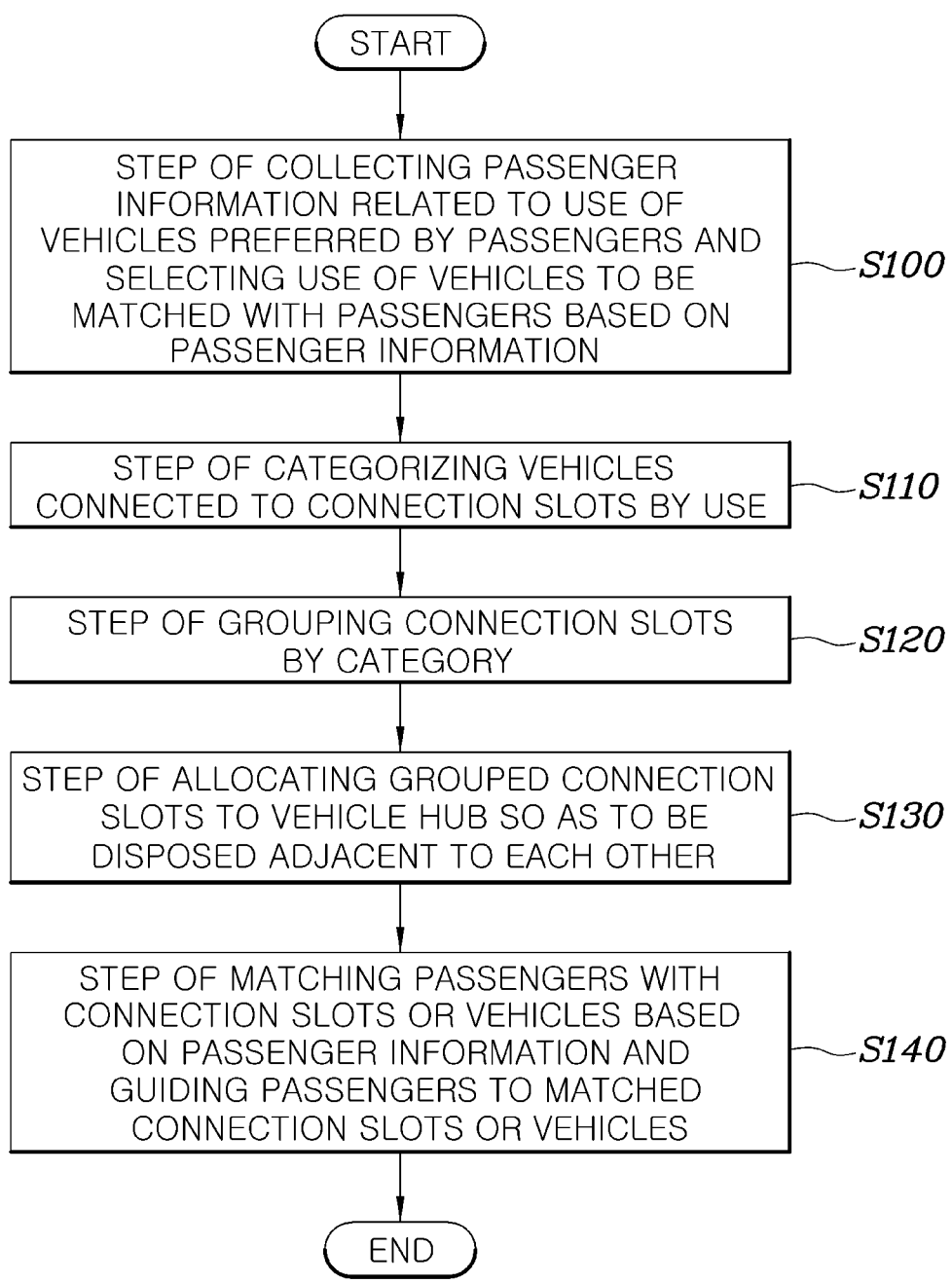
FIG. 3 is a flowchart showing an operation method of the transportation system according to the embodiment of the present invention.

FIG. 1 is a view showing vehicles and connection slots in a vehicle hub of a transportation system according to an embodiment of the present invention. FIG. 2 is a view showing that a plurality of vehicles is categorized into grouped connection slots by use in the vehicle hub of the transportation system according to the embodiment of the present invention. FIG. 3 is a flowchart showing an operation method of the transportation system according to the embodiment of the present invention.

FIG. 1 is a view showing vehicles and connection slots in a vehicle hub of a transportation system according to an embodiment of the present invention. FIG. 2 is a view showing that a plurality of vehicles is categorized into grouped connection slots by use in the vehicle hub of the transportation system according to the embodiment of the present invention. The transportation system according to the embodiment of the present invention includes a vehicle hub configured such that a plurality of connection slots 200 is formed, in the case in which a plurality of vehicles 100 is parked respectively in the connection slots 200, the vehicle hub is connected to interior spaces of the vehicles 100 through the connection slots 200, the plurality of vehicles 100 connected to the respective connection slots is categorized by use, the plurality of connection slots 200 is grouped (110, 120, 130, and 140) by category, and the grouped connection slots 200 are disposed adjacent to each other.

In the case in which autonomous vehicles are commercialized from now on, passengers may not directly drive the vehicles 100, and may perform various activities in the vehicles 100 for specific purposes while the vehicles 100 move to predetermined destinations. In order for the passengers to perform various activities in the vehicles 100 for specific purposes, therefore, the vehicle hub may perform control such that the vehicles 100 are provided with articles necessary for various activities and such that the vehicles 100 are disposed in the connection slots 200 in the vehicle hub depending on demand or preference of the passengers. The vehicle hub is a complex terminal. Passengers may board the vehicles 100 in the vehicle hub, or may also use the vehicle hub as transfer passages. In the case in which connection slots 200 grouped by category are disposed adjacent to each other, therefore, passengers belonging to the same categories may more easily and rapidly move to and board the vehicles.

In addition, the transportation system according to the embodiment of the present invention may further include a server (which inherently includes a processor, e.g., a server processor) configured to collect passenger information related to the use of the vehicles 100 preferred by passengers, to match the passengers with the connection slots 200 or the vehicles 100 based on the passenger information, and to guide the passengers to the matched connection slots 200 or vehicles 100. Upon receiving a request for a necessary vehicle 100 from a passenger, the server allows the passenger to select whether the purpose of movement is simple movement, movement for business, or urgent movement. Subsequently, the passenger directly selects the use of the vehicle 100 provided in the vehicle hub, or the server may analyze the tendency or preference of the passenger to select the use of the vehicle. The server may park the vehicle 100 in the connection slots 200 grouped by category, and may guide the passenger to the matched vehicle 100 or connection slot 200. The passenger may board the provided vehicle 100 to move to a destination. During movement, the passenger may perform various activities by use in the vehicle.

Meanwhile, in the transportation system according to the embodiment of the present invention, the server may request consent for collection of passenger information upon receiving a request for a vehicle from a terminal of the passenger. In the case in which consent for collection of passenger information is obtained, the server may collect the passenger information from the terminal of the passenger. In the transportation system according to the embodiment of the present invention, the passenger information may include retrieval information of the terminal of the passenger, location information, health information, picture information, or commodity purchase information, and the server may select the use of a vehicle to be matched with the passenger based on the retrieval information of the terminal of the passenger, the location information, the health information, the picture information, or the commodity purchase information.

Specifically, in the case in which the passenger consents to provision of personal information, the server collects retrieval, picture, or location information of an electronic device, such as a personal mobile phone or a desktop computer, receives health information of the passenger, or collects reservation information, such as public performances, movies, personal articles, hotels, resorts, and lodging. The server analyzes or classifies the tendency or preference of the passenger using a big data analysis-based technique (AI) based on the passenger information in order to sort vehicle hub zones or to select the use or purpose of the vehicle 100.

Also, in the transportation system according to the embodiment of the present invention, the server may set a movement route of the vehicle 100 based on the use of the vehicle 100 matched with the passenger, and may perform control such that the vehicle 100 moves along the set movement route after boarding of the passenger. For example, in the case in which the passenger must urgently move, the transportation means must move via a specific place, or a time for the passenger to perform various activities in the vehicle 100 based on the purpose or use of the vehicle 100 is necessary, the server may calculate a necessary time, may set the movement route of the vehicle 100 based thereon, and may perform control such that the vehicle 100 moves along the set movement route.

Meanwhile, in the transportation system according to the embodiment of the present invention, in the case in which a plurality of vehicles 100 is categorized by use, the category may include rest, health care, business, or taste. In the transportation system according to the embodiment of the present invention, articles provided in the plurality of vehicles 100 may be replaced depending on the use or category thereof. Demand for the vehicles 100 disposed in the vehicle hub changes depending on the use or category based on tendency or preference of passengers. When there is a request for boarding of passengers, therefore, the vehicle hub predicts demand for vehicles 100 belonging to the use or category based on tendency or preference of passengers, and performs control such that the vehicles 100 wait in the connection slots 200. In the case in which demand is higher or lower than predicted, articles provided in each vehicle 100 are replaced, whereby the use or category of the vehicles 100 is changed, and therefore the demands of passengers are satisfied.

Specifically, in the transportation system according to the embodiment of the present invention, a vehicle classified into the rest category, among the plurality of vehicles, may be provided therein with a bed or a chair, whereby it is possible to induce sleep or meditation of a passenger. In the transportation system according to the embodiment of the present invention, a vehicle classified into the health care category, among the plurality of vehicles, may be provided therein with a remote medical treatment module, a physical therapy module, a rehabilitation module, or a first aid module. In the transportation system according to the embodiment of the present invention, a vehicle classified into the business category, among the plurality of vehicles, may be provided therein with a computer, a facsimile, a copier, or a scanner. In the transportation system according to the embodiment of the present invention, a vehicle classified into the taste category, among the plurality of vehicles, may be provided therein with a movie watching module, a music listening module, a fitness equipment module, a food provision module, a reading module, or a game module. As described above, articles provided in each vehicle 100 by use or category are changed depending on the tendency or preference of the passenger such that the passenger can perform various activities using the articles provided in the vehicle 100.

Meanwhile, in the transportation system according to the embodiment of the present invention, the vehicle hub may be provided with a waiting area at which passengers wait before boarding the vehicles 100. The grouped connection slots 110, 120, 130, and 140 may be disposed close to the waiting area in the case in which urgency of the category is high, and may be disposed far from the waiting area in the case in which urgency of the category is low.

For example, for the health care category, urgency of which is high, the grouped connection slots 200 may be disposed closest to the waiting area such that urgent patients can move to destination while receiving medical treatment as quickly as possible. The connection slots 200 for passengers who need the next urgent movement may be disposed close to the waiting area. For the fitness, taste, or rest category, urgency of which is very low, the grouped connection slots 200 may be disposed farther from the waiting area than for the health care category or the urgent movement category.

FIG. 3 is a flowchart showing an operation method of the transportation system according to the embodiment of the present invention. The operation method of the transportation system according to the embodiment of the present invention includes a step (S110) of categorizing a plurality of vehicles connected respectively to a plurality of connection slots by use, a step (S120) of grouping the plurality of connection slots by category, and a step (S130) of allocating the grouped connection slots to a vehicle hub so as to be disposed adjacent to each other.

In addition, the operation method of the transportation system according to the embodiment of the present invention may further include a step (S100) of collecting passenger information related to the use of vehicles preferred by passengers and selecting the use of the vehicles to be matched with the passengers based on the passenger information before the step (S110) of categorizing the plurality of vehicles connected to the connection slots by use.

Meanwhile, the operation method of the transportation system according to the embodiment of the present invention may further include a step (S140) of matching the passengers with the connection slots or the vehicles based on the passenger information and guiding the passengers to the matched connection slots or vehicles after the step (S130) of allocating the grouped connection slots to the vehicle hub so as to be disposed adjacent to each other.

In the transportation system according to the embodiment of the present invention, connection slots 200, in which vehicles 100 are parked, are grouped by use or category, whereby it is possible for passengers to easily and rapidly board the vehicles 100 and to perform various activities based on the use or category of the vehicles 100 in the vehicles 100. In addition, a server analyzes tendency or preference of the passengers to allocate the vehicles 100 to the connection slots 200, and controls allocation thereof, whereby it is possible for the passengers to efficiently use the vehicles 100 and a vehicle hub.

As is apparent from the above description, in a transportation system according to the present invention and an operation method thereof, a plurality of vehicles having different uses is provided, the plurality of vehicles is parked in connection slots of a vehicle hub that functions as a complex terminal, the vehicles are categorized by use, the connection slots are grouped by category, the grouped collection slots are disposed adjacent to each other in the vehicle hub, and a server controls a movement route of each vehicle and guides passengers to vehicles having uses preferred by the passengers.

Although the preferred embodiments of the present invention have been described above with reference to the accompanying drawings, those skilled in the art will appreciate that the present invention can be implemented in various other embodiments without changing the technical ideas or features thereof.

What is claimed is:
1. A transportation system, comprising:
   a vehicle hub comprising:
      a waiting area at which the passengers may wait before boarding a plurality of vehicles including respective interior spaces; and
      a plurality of connection slots, wherein in response to vehicles being parked respectively in the connection slots, the vehicle hub is connected to the interior spaces of the vehicles through the connection slots; and
   a server configured to:
      categorize the vehicles by use;

group the connection slots by ranked categories such that the connection slots that are grouped together by category are disposed adjacent to each other; and in a case in which a rank of the category in which corresponding vehicles, among the vehicles, is classified as being high as compared with a case in which the rank of the category in which the corresponding vehicles is classified as being low, arrange the connection slots closer to the waiting area.

2. The transportation system according to claim 1, the server is further configured to:

collect passenger information related to a use of the vehicles preferred by passengers;

match the passengers with the connection slots or the vehicles based on the passenger information; and generate control signals configured to direct the passengers to the matched connection slots or vehicles.

3. The transportation system according to claim 2, wherein the server is further configured to:

request consent for collection of the passenger information upon receiving a request for a vehicle from a terminal of each passenger among the passengers; and collect the passenger information from the terminal in response to the consent for collection of the passenger information being obtained from the terminal.

4. The transportation system according to claim 2, wherein the passenger information comprises any one or any combination of any two or more of retrieval information of the terminal, location information, health information, picture information, and commodity purchase information, and wherein the server is further configured to select a use of a vehicle, among the vehicles, to be matched with each passenger based on the any one or any combination of any two or more of the retrieval information of the terminal, the location information, the health information, the picture information, and the commodity purchase information.

5. The transportation system according to claim 2, wherein the server is further configured to:

set a movement route of a vehicle, among the vehicles, based on a use of the vehicle matched with a passenger among the passengers and control movement of the vehicle along the set movement route after the boarding of the passengers.

6. The transportation system according to claim 1, wherein the vehicles are categorized by use by being classified in a category among a rest category, a health care category, a business category, and a taste category.

7. The transportation system according to claim 6, wherein a vehicle classified in the rest category, among the vehicles, is equipped with a bed or a chair, to induce sleep or meditation of the passenger.

8. The transportation system according to claim 6, wherein a vehicle classified in the health care category, among the vehicles, is equipped with a remote medical treatment module, a physical therapy module, a rehabilitation module, or a first aid module.

9. The transportation system according to claim 6, wherein a vehicle classified in the business category, among the vehicles, is equipped with a computer, a facsimile, a copier, or a scanner.

10. The transportation system according to claim 6, wherein a vehicle classified in the taste category, among the vehicles, is equipped with a movie watching module, a music listening module, a fitness equipment module, a food provision module, a reading module, or a game module.

11. The transportation system according to claim 6, wherein articles provided in the vehicles are replaced depending on the use or the category.

* * * * *